United States Patent [19]
Baghdasarian

[11] Patent Number: 6,010,096
[45] Date of Patent: Jan. 4, 2000

[54] DEPLOYMENT RESTRAINT AND SEQUENCING DEVICE

[75] Inventor: Varouj Baghdasarian, Cupertino, Calif.

[73] Assignee: Space Systems/Loral, Inc., Palo Alto, Calif.

[21] Appl. No.: 09/120,486

[22] Filed: Jul. 22, 1998

[51] Int. Cl.$^7$ .................................................. B64G 1/44
[52] U.S. Cl. ........................................ 244/173; 160/135
[58] Field of Search .................... 244/173, 159; 160/135

[56] References Cited

U.S. PATENT DOCUMENTS

| | | | |
|---|---|---|---|
| 3,295,809 | 1/1967 | Smola et al. | 248/204 |
| 3,863,870 | 2/1975 | Andrews et al. | 244/173 |
| 4,014,617 | 3/1977 | Meston | 403/111 |
| 4,043,834 | 8/1977 | Rusch | 136/89 SA |
| 4,293,731 | 10/1981 | Schweig et al. | 136/245 |
| 4,371,134 | 2/1983 | Marello et al. | 244/173 |
| 4,394,529 | 7/1983 | Gounder | 136/245 |
| 4,561,614 | 12/1985 | Olikara et al. | 244/173 |
| 4,988,060 | 1/1991 | Janson et al. | 244/173 |
| 5,037,043 | 8/1991 | Roth et al. | 244/173 |
| 5,319,905 | 6/1994 | Szirtes | 52/108 |
| 5,393,018 | 2/1995 | Roth et al. | 244/173 |
| 5,509,747 | 4/1996 | Kiendl | 403/102 |
| 5,520,747 | 5/1996 | Marks | 136/245 |
| 5,673,459 | 10/1997 | Baghdasarian | 16/308 |
| 5,785,280 | 7/1998 | Baghdasarian | 244/173 |
| 5,810,296 | 9/1998 | Izumi | 244/173 |
| 5,909,860 | 6/1999 | Lee | 244/173 |

FOREIGN PATENT DOCUMENTS

| | | |
|---|---|---|
| 0064917 | 4/1982 | European Pat. Off. . |
| 101361 | 2/1984 | European Pat. Off. . |
| 309650 | 4/1989 | European Pat. Off. . |
| 578176 | 1/1994 | European Pat. Off. . |
| 2051480 | 1/1981 | United Kingdom . |

OTHER PUBLICATIONS

Thirteenth IEEE Photovoltaic Specialists Conference, Jun. 5–8, 1978, Williams et al., "The ESA Lightweight Hybrid Solar Array", pp. 226–231.

Proceedings of the First European Symposium on Photovoltaic Generators in Space, Sep. 11–13, 1978, Champion et al., "The ESA Lightweight Hybrid Solar Array", pp. 247–253.

Aircraft Engineering, Jan. 1984, Kellermeier et al., "The Retractable Ultra–Lightweight (ULP) Solar Array For Retrievable Space Platforms", pp. 2–5.

Proceedings of the European Space Power Conference, Aug. 1989, Cruijssen, "Solar Array Design for Columbus Elements", pp. 573–584.

Twenty First Photovoltaic Specialists Conference, May 21–25, 1990, Ralph et al., "Retractable Planar Space Photovoltaic Array", pp. 1369–1373.

*Primary Examiner*—Michael J. Carone
*Assistant Examiner*—James S. Bergin
*Attorney, Agent, or Firm*—Perman & Green, LLP

[57] ABSTRACT

Self-latching deployment apparatus for a multi-paneled solar array comprises at least first and second in-line panels pivotally connected together for rotation about an in-line hinge axis between stowed and deployed positions. A first deployment and locking mechanism maintains the in-line panels in the deployed position. First and second side panels are pivotally attached to opposite edges of the second in-line panel for rotation between stowed and deployed positions about secondary and tertiary hinge axes, respectively, transverse to the in-line hinge axis between the first and second in-line panels. A first restraint mechanism is engaged with the first side panel to temporarily overpower a drive mechanism for the first side panel and thereby temporarily maintain the first side panel in the stowed position but becomes disengaged from the first side panel when the first and second in-line panels reach the deployed position to enable the first side panel to move to the deployed position. A second restraint mechanism is engaged with the second side panel to temporarily overpower a drive mechanism for the second side panel and thereby temporarily maintain the second side panel in the stowed position but becomes disengaged from the second side panel when the first side panel reaches the deployed position to enable the second side panel to move to the deployed position.

13 Claims, 8 Drawing Sheets

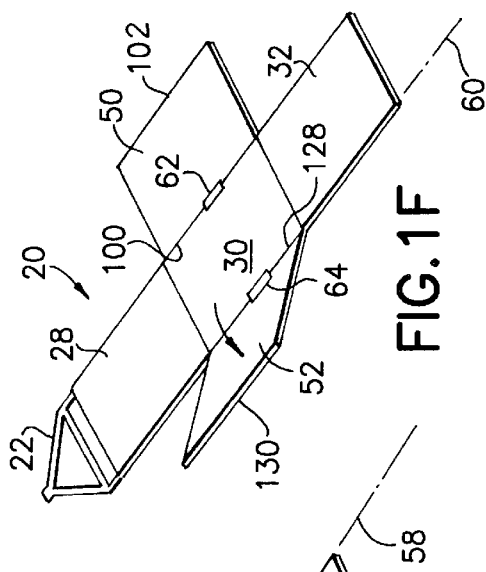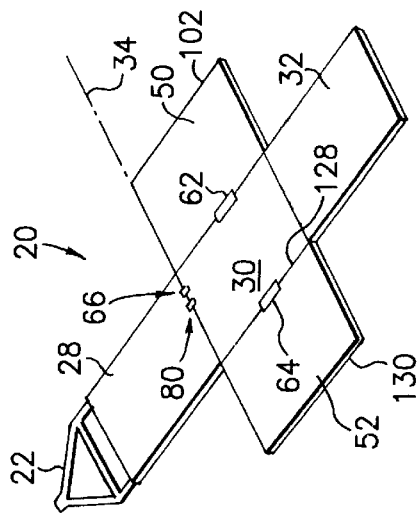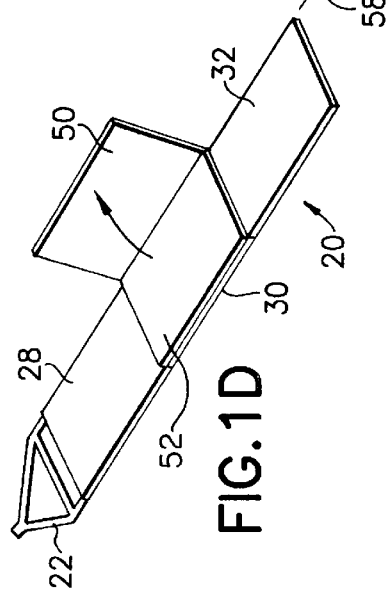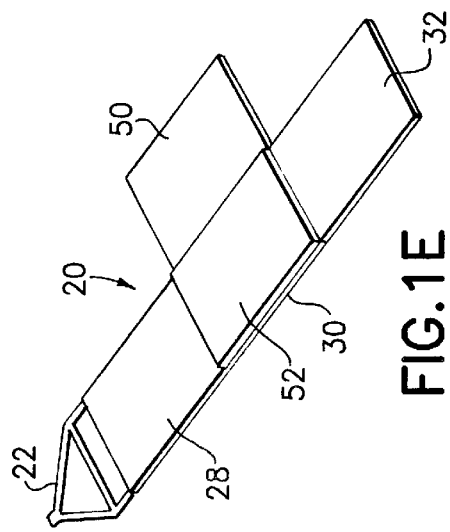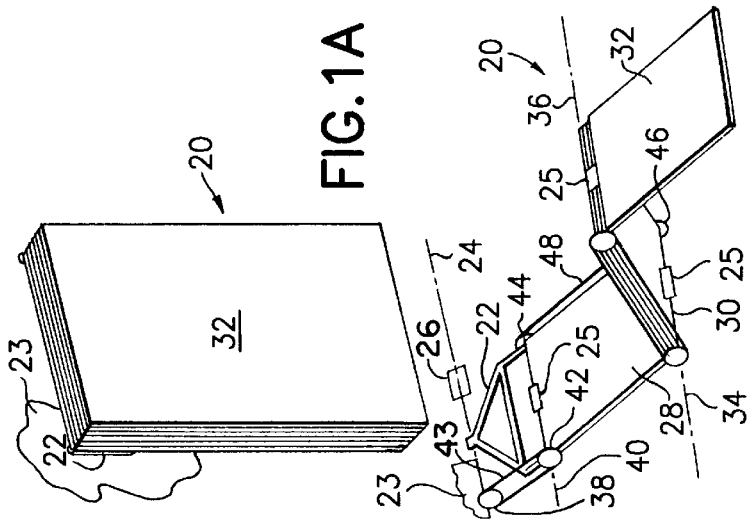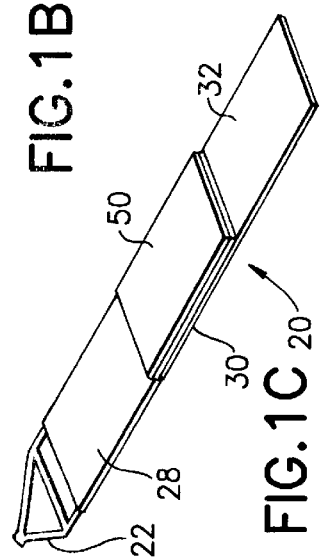

DEPLOYMENT RESTRAINT AND SEQUENCING DEVICE

BACKGROUND OF THE INVENTION

1. Field of the Invention

The present invention relates generally to communication satellites, space stations, and the like which utilize solar panel arrays as a major source of power. More specifically, the invention relates to a multi-paneled solar array comprising a plurality of in-line panels pivotally connected for rotation between stowed and deployed positions and side panels pivotally connected to one or more of the in-line panels also for rotation between stowed and deployed positions, mechanisms being provided to prevent the side panels from deploying while the in-line panels are being deployed, and releasing them after the in-line panels are out of the way and fully deployed.

2. Description of the Prior Art

Collapsible and deployable structures in general are relatively well known and have been widely used in space applications to provide, for example, an antenna or the like for receiving and/or transmitting radio signals. Such collapsible structures advantageously can be stowed compactly in a space vehicle for launching into space and then deployed to the desired expanded configuration.

Generally, such devices are required to perform the following functions:

- an actuating function, since the spacecraft is not always possessed of spinning motion;
- a damping function, to avoid the onset at the end of deployment of excessive stresses in the structure supporting the articulation device;
- a positioning function, called for by the very functions which the deployable structures are required to fulfill; and
- the function of equalizing the rates of opening of the different deployable structures, in order to prevent stability impairing asymmetrical forces from being engendered during rotation of the spacecraft.

The execution of these functions is often closely linked to such strict requirements as: minimum size and weight; the exclusion of nonmetallic materials which may de-gas in space; the exclusion of magnetic materials; extreme accuracy in positioning the deployed appurtenances; and fail-safe operation.

Further, such systems must be capable of ensuring extension of the spacecraft elements under greatly varying conditions such as:

- inertia forces due to a rotating motion that are superimposed upon the actuating function and call upon the damping function to operate over a very wide energy band;
- a wide temperature range;
- a high vacuum; and
- a weightless environment.

It is a principal objective of the present invention to provide a mechanism for satisfying the above-mentioned functions and the requirements for carrying out these functions.

The primary power source for communication satellites, space stations, and spacecraft in general are provided by solar arrays using some type of photovoltaic solar cells. The arrays are normally stowed against the satellite during launch, and deployed either after separation from the launch vehicle or once they are in their final orbital location. Deployment of a typical in-line rigid panel solar array (comprising a yoke and three to four panels) is synchronized using closed cable loops of a known construction. For higher power solar arrays, it is preferable to add secondary, or side, panels to the sides of the existing in-line panels, rather than to the end of the last in-line panel so as to keep the array structure to a reasonable length. Deployment and sequencing of these side panels must be coordinated with the deployment of the in-line panels such that they do not interfere with each other during deployment, and such that they are sequenced so that the side panels are released and deployed after completion of the in-line panel deployment. The mechanism required to initiate the release of these side panels is the subject of this invention.

Existing release mechanisms for such a side panel deployment may be comprised of a separate hold down and a release device actuated by a remote ground command Further, it is a requirement to release and deploy the side panels after completion of the in-line panel deployment.

Any separate hold down and release device for these side panels requires special hardware and software to activate and perform the release function. Use of any hardware or software introduces additional mass and complexity to the design.

An objective of this invention is to minimize the need for new hardware required to hold down the side panels from deploying while the in-line panels are being deployed, and release them after the in-line panels are out of the way and fully deployed.

A number of patents disclose various deployment hinge constructions which include a position locking device which is effected when a component such as a solar panel, antenna, reflector, or the like, is fully deployed. In this regard, U.S. Patents to Roth et al., U.S. Pat. Nos. 5,037,043 and 4,880,188 disclose spring biased solar panels having an actuating cam formed with a locking notch to prevent further movement once deployment is achieved. U.S. Pat. No. 4,290,168 to Binge discloses a damper for positively locked spring biased hinges. A variety of constructions of spring biased mechanisms for deploying solar panels and the like are disclosed in U.S. Pat. No. 4,780,726 to Archer et al. and U.S. Pat. No. 3,587,999 to Miniovitch et al.

Of more recent interest is the commonly assigned U.S. Pat. No. 5,673,459 to Baghdasarian which discloses deployment hinge apparatus comprising a stationary U-shaped bracket including a flange defining a retention recess. A hinge arm for supporting an operating structure such as a communication antenna reflector is pivotally mounted on the stationary bracket for movement between a stowed position and a deployed position. The hinge arm includes a deployment and latching cam which extends to a projecting nose member. A latch arm is pivotally mounted at one end to the stationary bracket and includes a cam follower at its other end operatively engageable with the cam. A spring biases the cam follower into engagement with the cam and is thereby effective to rotate the hinge arm from the stowed position to the deployed position such that, in the deployed position, the nose member and the cam follower are together snugly received in the retention recess, locking the hinge arm in the deployed position.

It was with knowledge of the foregoing state of the technology that the present invention has been conceived and is now reduced to practice.

SUMMARY OF THE INVENTION

The present invention therefore concerns self-latching deployment apparatus for a multi-paneled solar array which comprises at least first and second in-line panels pivotally connected together for rotation about an in-line hinge axis between stowed and deployed positions. A first deployment and locking mechanism maintains the in-line panels in the deployed position. First and second side panels are pivotally attached to opposite edges of the second in-line panel for rotation between stowed and deployed positions about secondary and tertiary hinge axes, respectively, transverse to the in-line hinge axis between the first and second in-line panels. A first restraint mechanism is engaged with the first side panel to temporarily overpower a drive mechanism for the first side panel and thereby temporarily maintain the first side panel in the stowed position but becomes disengaged from the first side panel when the first and second in-line panels reach the deployed position to enable the first side panel to move to the deployed position. A second restraint mechanism is engaged with the second side panel to temporarily overpower a drive mechanism for the second side panel and thereby temporarily maintain the second side panel in the stowed position but becomes disengaged from the second side panel when the first side panel reaches the deployed position to enable the second side panel to move to the deployed position.

To meet the requirements for side panel release and deployment following the in-line panel deployment, it is proposed that the release of the side panels be triggered from deployment of the in-line panels, specifically, from latching of the in-line panel hinges. This insures that the in-line panels are out of the way and fully deployed before release of the side panels, and further, that no separate ground command is required to initiate and sequence the release and the deployment of the side panels.

The proposed release device comprises a restraint lever attached to the in-line panel deployment hinge latching mechanism. This restraint lever is designed and positioned such that it prevents release and deployment of the side panel while the in-line panel is being deployed. Latching of the in-line panels is accomplished at the end of the deployment by engagement of a latch pin into a latch slot.

The release and deployment restraint device is designed such that it blocks deployment of the side panel as long as the latch of the respective in-line hingeline is riding on a circular cam of the in-line panel hinge. As the in-line panel latches at the end of its deployment, the latch pin falls into the latch slot. Rotation of the latch arm causes the hook to move away from its restraining position therefore allowing the side panel to release and deploy under their own hingeline spring torque. The release and deployment can only be allowed after the respective in-line panel hinge-line is fully latched. This insures proper sequencing of the side panel release and deployment so that there is no interference between the side panel deployment and the in-line panel deployment.

The latch release device is designed such that a first, upper, side panel releases upon latching of the in-line panels, and then, a second, lower, side panel releases upon latching of the first side panel.

To deploy the solar array wing, a ground command is sent to release all holddowns securing the wing to the spacecraft. Then, the yoke and the in-line panels start deploying in a synchronized fashion and latch up. Upon latching of the in-line hingelines, the first side panel (the upper one in the stowed case) is released and allowed to deploy and latch. Upon latching of the first side panel the second side panel (the lower one) is released and allowed to deploy and latch. Thus, a proper deployment sequence is insured for all wing components such that there is no interference between the side-panel and the in-line panel deployments.

Thus, the deployment restraint and sequencing device can be said to possess the following features:

high reliability;

it provides deployment restraint for the side panels;

it allows side-panel release after a specific in-line hinge-line is latched;

it requires no additional release pyros or remote commanding;

it is simple, light weight, and inexpensive; and it fits within an existing launch vehicle envelope.

Although the release mechanism of the invention may be designed to be activated by latching of in-line panel hinges at 180°, the hinge design can be modified to activate the subject release mechanism at any angle of the in-line panel. Further, application of this device is not restricted to a solar array of any specific number of arrays.

A primary feature, then, of the present invention is the provision of a multi-paneled solar array comprising in-line panels and side panels with a mechanism for preventing the side panels from deploying while the in-line panels are being deployed, then releasing them after the in-line panels are out of the way and fully deployed.

Another feature of the present invention is the provision of such a multi-paneled solar array comprising a plurality of in-line panels pivotally connected for rotation between stowed and deployed positions and side panels pivotally connected to one or more of the in-line panels also for rotation between stowed and deployed positions, mechanisms being provided to prevent the side panels from deploying while the in-line panels are being deployed, and releasing them after the in-line panels are out of the way and fully deployed.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIGS. 1A through 1G illustrate incremental configurations achieved by a solar array embodying the deployment restraint and sequencing system of the invention;

DETAILED DESCRIPTION OF THE PREFERRED EMBODIMENTS

Figure 2:
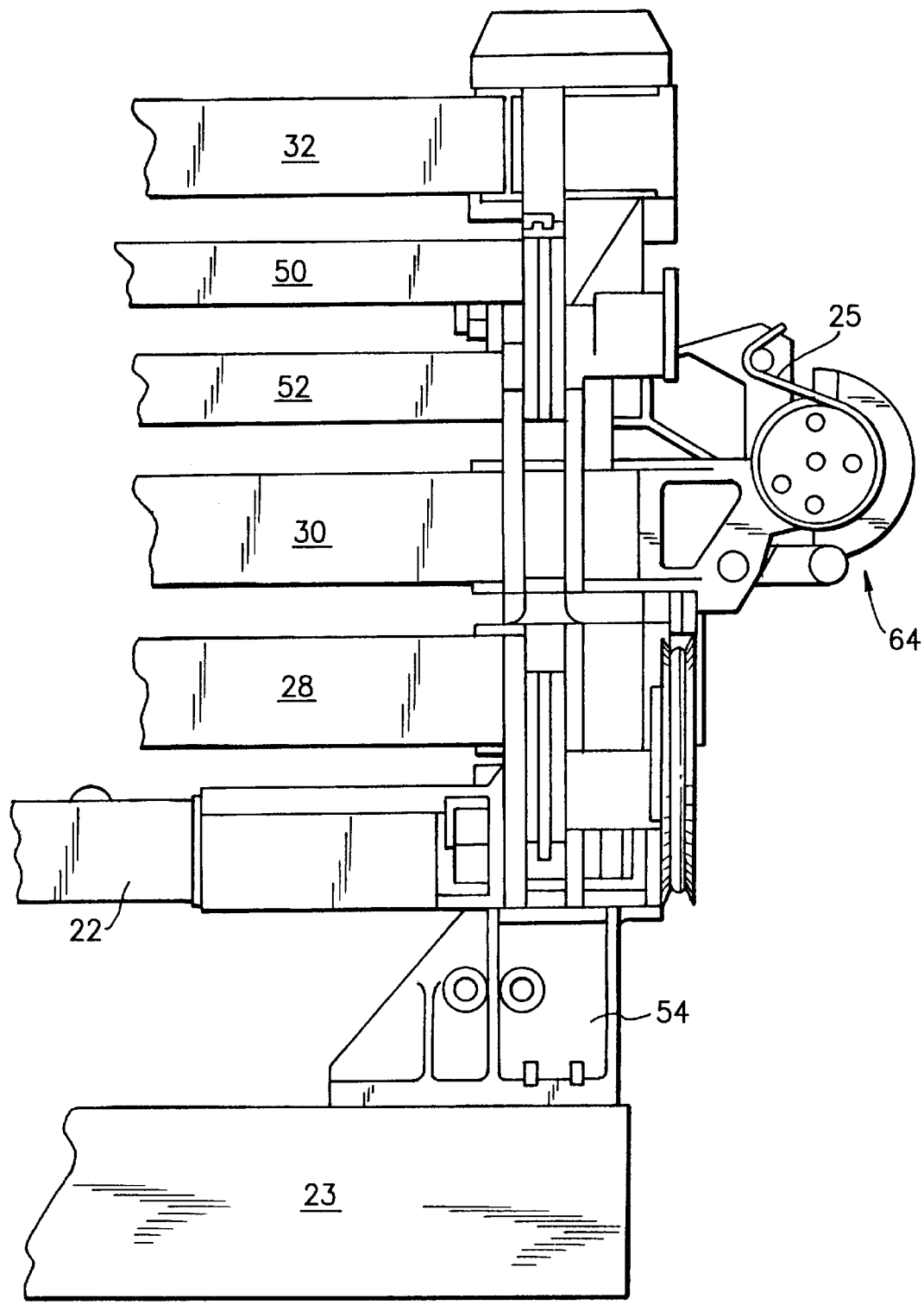
FIG. 2 is an elevation view generally illustrating the deployment restraint and sequencing system of the invention with the solar array in stowed position.

Turn now to the drawings and, initially, to FIGS. 1A through 1G which generally illustrate, diagrammatically, a sequence of operations performed in deploying a solar array 20 constructed in accordance with the invention.

In typical fashion, viewing FIGS. 1A and 1B initially, a yoke 22 is pivotally mounted on a satellite side wall 23 for rotation about a yoke hingeline 24 (FIG. 1B), such rotation being impaired by unwinding of wound springs 25 located integral with each hinge. The deployment may also be accomplished by the selective operation of a deployment motor 26. First, second, and third in-line panels, 28, 30, and 32 are pivotally attached for rotation between stowed and deployed positions about respective in-line panel hinge axes 34, 36. A synchronization pulley 38 is fixed on the satellite side wall 23 and a first set of hinges (not shown) are provided for pivotally mounting the first in-line panel 28 to the yoke 22 for mutual rotation about a first panel hinge axis 40. A first in-line panel pulley 42 is fixed to the first in-line panel 28 and centered on the first panel hinge axis 40. A first synchronization cable 43 is fixed, respectively, to the side wall synchronization pulley 38 and to the first in-line panel pulley 42. A yoke pulley 44 is fixed to the yoke 22, centered on the first panel hinge axis 40 distant from the first in-line panel pulley 42. A second set of hinges (not shown) are provided for pivotally mounting the second in-line panel 30 to the first in-line panel 28 for mutual rotation about the second in-line hinge axis 34. In turn, a second in-line panel pulley 46 is fixed to the second in-line panel 30 and is centered on the second in-line panel hinge axis 34. A second synchronization cable 48 is fixed, respectively, to the yoke pulley 44 and to the second in-line panel pulley 46.

A similar construction, which will not be described, pertains with respect to in-line panels 30, 32. In this manner, the deployment springs in each axis are linked together and are effective to move the yoke 22, the first in-line panel 28, the second in-line panel 30, the third in-line panel 32, and any others that there may be, to the deployed position whereat the yoke and the first, second, and third rigid solar panels are mutually coplanar and extend transversely of the satellite side wall (FIG. 1C). Thus, the in-line panels 28, 30, 32 and the side panels 50, 52 are all substantially coextensive and lie in successively spaced planes when they are in their stowed positions and lie in side-by-side relationship and are substantially coplanar when they are in their deployed positions.

As earlier described, to deploy the solar array 20, initially in a stowed position (FIG. 1A) proximate the spacecraft or satellite 23, a ground command is sent to release all securing holddowns as represented by the bracket 54 (FIG. 2). Then, the yoke 22 and the in-line panels 28, 30, 32 start deploying (FIG. 1B) in a synchronized fashion and latch up. Upon latching of the in-line hinge axes (FIG. 1C), a first side panel 50 is released and allowed to deploy (FIG. 1D) and latch (FIG. 1E). Upon latching of the first side panel, a second side panel 52 is released and allowed to deploy (FIG. 1F) and latch (FIG. 1G). In this manner, a proper deployment sequence is insured for all components of the array 20 such that there is no interference during deployment between the side panels 50, 52 and the in-line panels 28, 30, 32. The construction which enables this proper deployment sequence will now be described.

It was earlier explained that the in-line panels 28 and 30 are pivotally connected together for rotation between stowed and deployed positions about the in-line hinge axis 34. With particular reference now to FIGS. 2–6, a suitable in-line panel drive mechanism such as the springs 25 (FIGS. 1B and 2) is provided for moving the in-line panels 28, 30 between the stowed and the deployed positions. The springs 25 in each hingline may be a torsion spring or a constant torque spring, but its composition need not be so limited. It was also earlier explained that first and second side panels 50, 52 are pivotally connected to the second in-line panel 30 for rotation between stowed and deployed positions. The pivotal connection between the side panel 50 and the in-line panel 30 occurs about a secondary hinge axis 58 (FIG. 1D) extending transverse to the hinge axes 34, 36, 40. The pivotal connection between the side panel 52 and the in-line panel 30 occurs about a tertiary hinge axis 60 (FIG. 1F) also extending transverse to the hinge axes 34, 36, 40 and parallel to and spaced from the secondary hinge axis 58. Suitable side panel drive mechanisms 62, 64 are provided, respectively, for moving the side panels 50, 52 between the stowed and the deployed positions. The drive mechanisms 62, 64 (see FIGS. 1F and 1G) are each illustrated as including a torsion spring or a constant torque spring, but in each instance its composition need not be so limited. While only one drive mechanism is indicated in each instance, it is actually necessary that at least two spaced apart drive mechanism be provided for proper operation.

Figure 3:
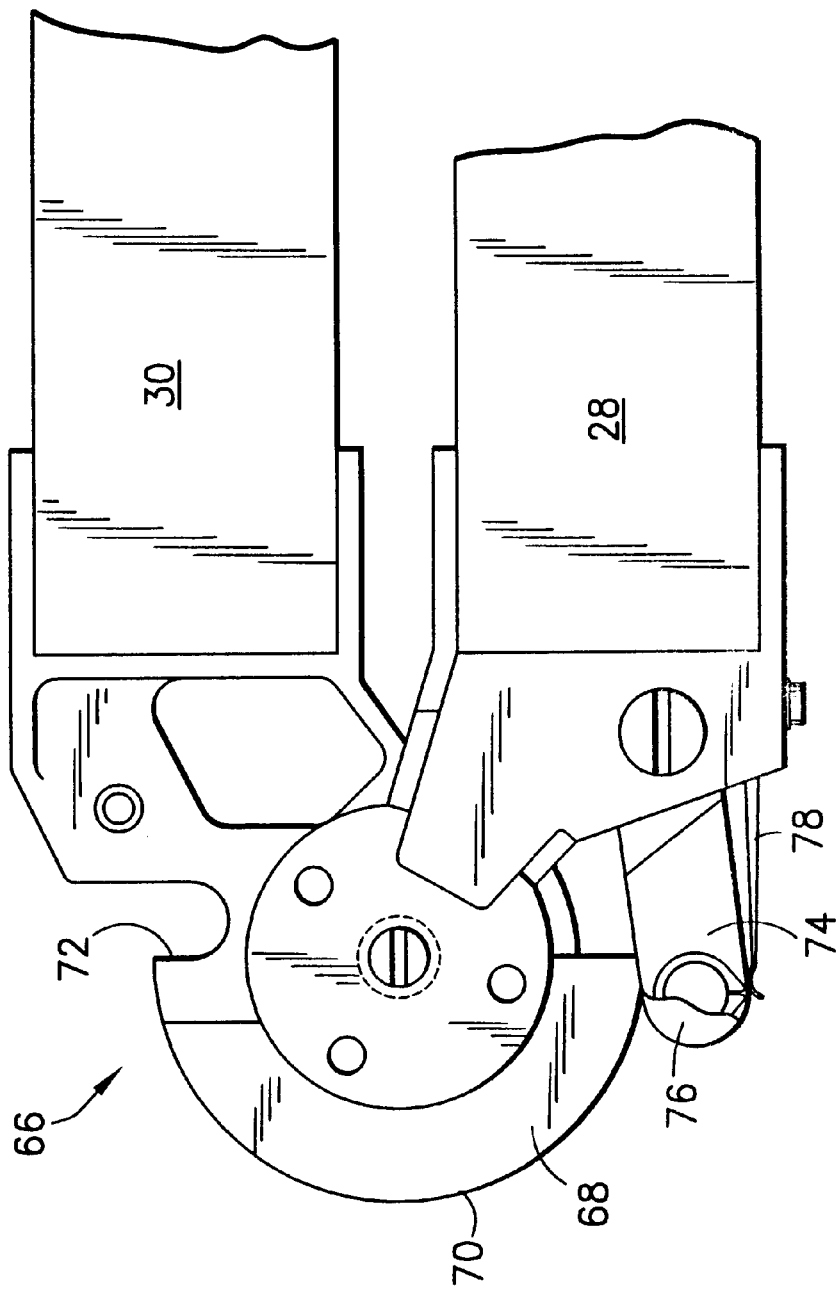
FIG. 3 is a detail elevation view illustrating a deployment and deployment and locking mechanism, presently inoperative, for a pair of in-line panels.
Figure 5:
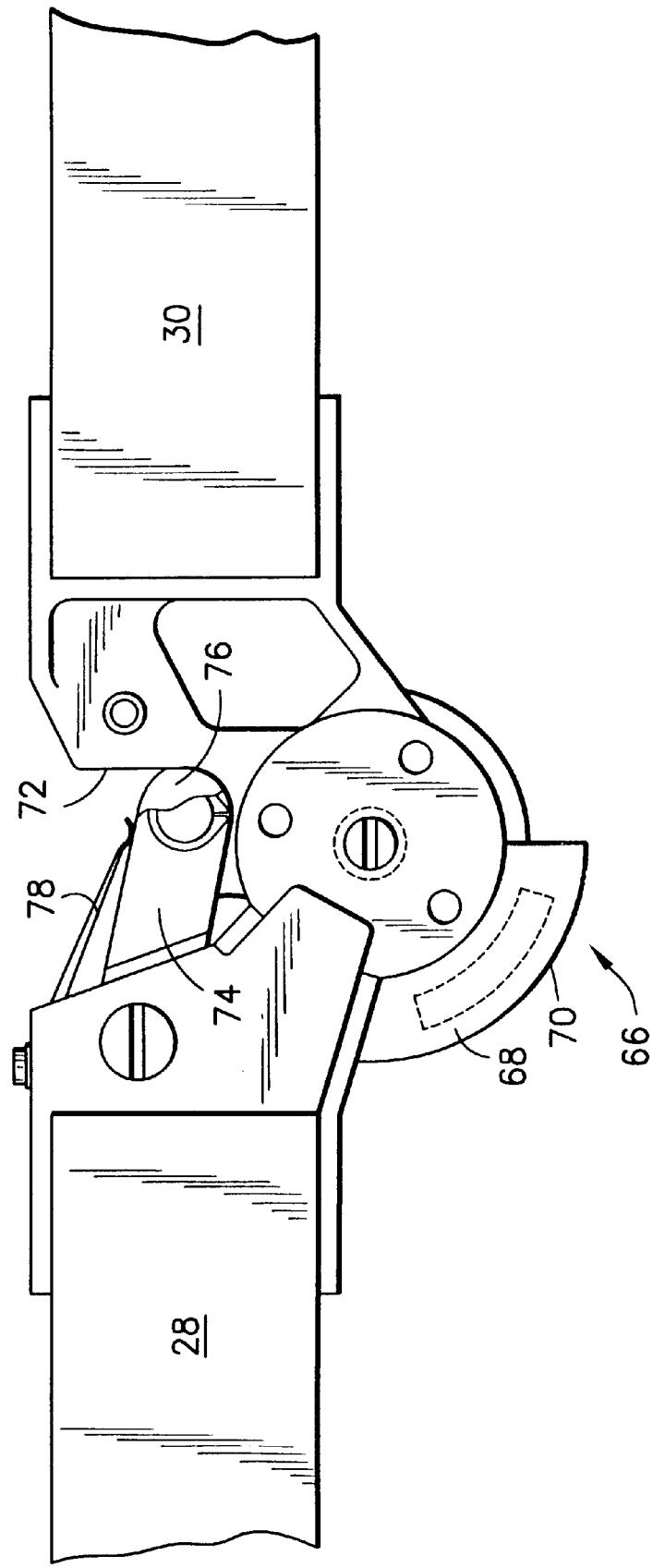
FIG. 5 is a detail elevation view illustrating full deployment of adjoining in-line panels which are in a locked configuration.

As seen particularly well in FIGS. 3 and 5, a deployment and locking mechanism 66 is provided for driving the first and second in-line panels 28, 30 to the deployed position, then locking them in the deployed position. The deployment and locking mechanism 66 includes a locking cam 68 fixed to the in-line panel 28 and aligned on the in-line hinge axis 34. The locking cam 68 includes a cam surface 70 which is of constant radius and terminates at a locking recess 72. The locking cam 68 is coaxial with the in-line hinge axis 34 and the locking recess 72 extends radially toward the axis 34 and in a direction away from the cam surface 70.

A cam follower 74 is mounted on the first in-line panel 28 and a roller 76 journaled thereon is biased into engagement with the cam surface 70 by a spring 78 for travel therealong as the in-line panels 28, 30 move between the stowed (FIG. 3) and deployed (FIG. 5) positions. When the in-line panels reach the deployed position, the cam follower roller 76 drops into, and is fully received by, the locking recess 72 under the bias of the spring 78. When this occurs, no further unintended movement is permitted between the in-line panels 28, 30.

Figure 4:
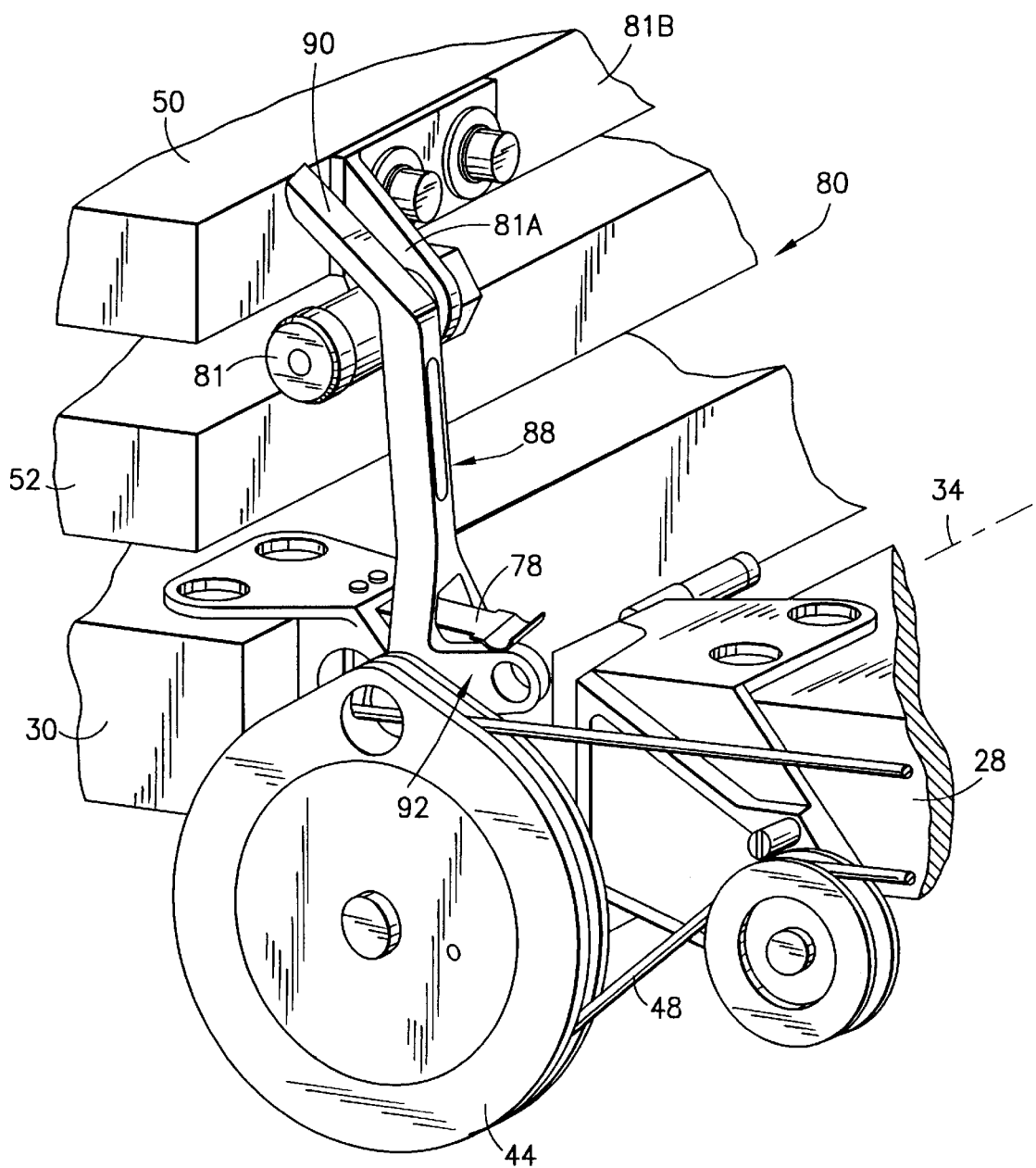
FIG. 4 is a detail perspective view illustrating a presently operative restraint mechanism for preventing deployment of a side panel until the in-line panels have fully deployed.
Figure 6:
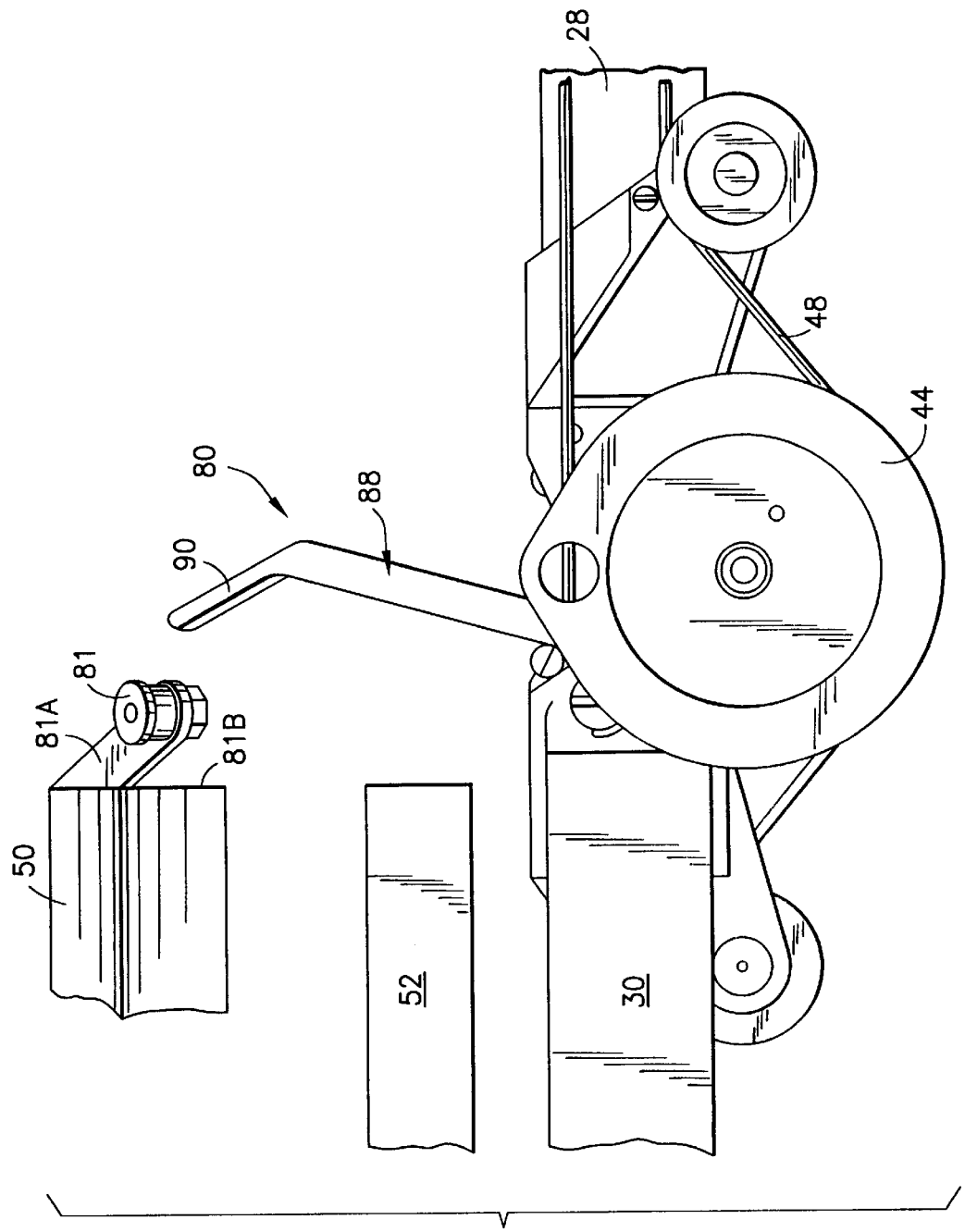
FIG. 6 is a detail elevation view illustrating full deployment of adjoining in-line panels which are in a locked configuration with one side panel being released for deployment.

As seen in FIGS. 4 and 6, a restraint mechanism 80 generally aligned with the in-line hinge axis 34 is normally engaged with the side panel 50, more specifically, with a restraint riller 81 integral with a restraint bracket 81A projecting away from an edge 81B of the side panel, to temporarily overpower the side panel drive mechanism 62 to thereby temporarily maintain the side panel 50 in the stowed position. Also, in a manner to be described, the restraint mechanism 80 becomes disengaged from the global restraint roller 81 of the side panel 50 when the first and second in-line panels 28, 30 reach the deployed position (FIGS. 5, 6) to enable the side panel 50 to begin to move to the deployed position.

More specifically, the restraint mechanism 80 (FIGS. 4 and 6) is associated with the deployment and locking mechanism 66 and includes a restraint lever 88 integral with the cam follower 74 shown in FIG. 5. The restraint lever extends to a restraining tab 90 at an extreme end distant from the pivotal mount, that is, from the in-line hinge axis 34. The restraining tab 90 is normally engaged with the restraint riller 81 of the side panel 50 until the second in-line panels 28, 30 are fully deployed (see FIGS. 5 and 6) at which time the restraining tab 90 moves out of engagement with the restraint riller of the side panel thereby freeing the side panel 50 for movement to the deployed position (FIG. 6).

Figure 7:
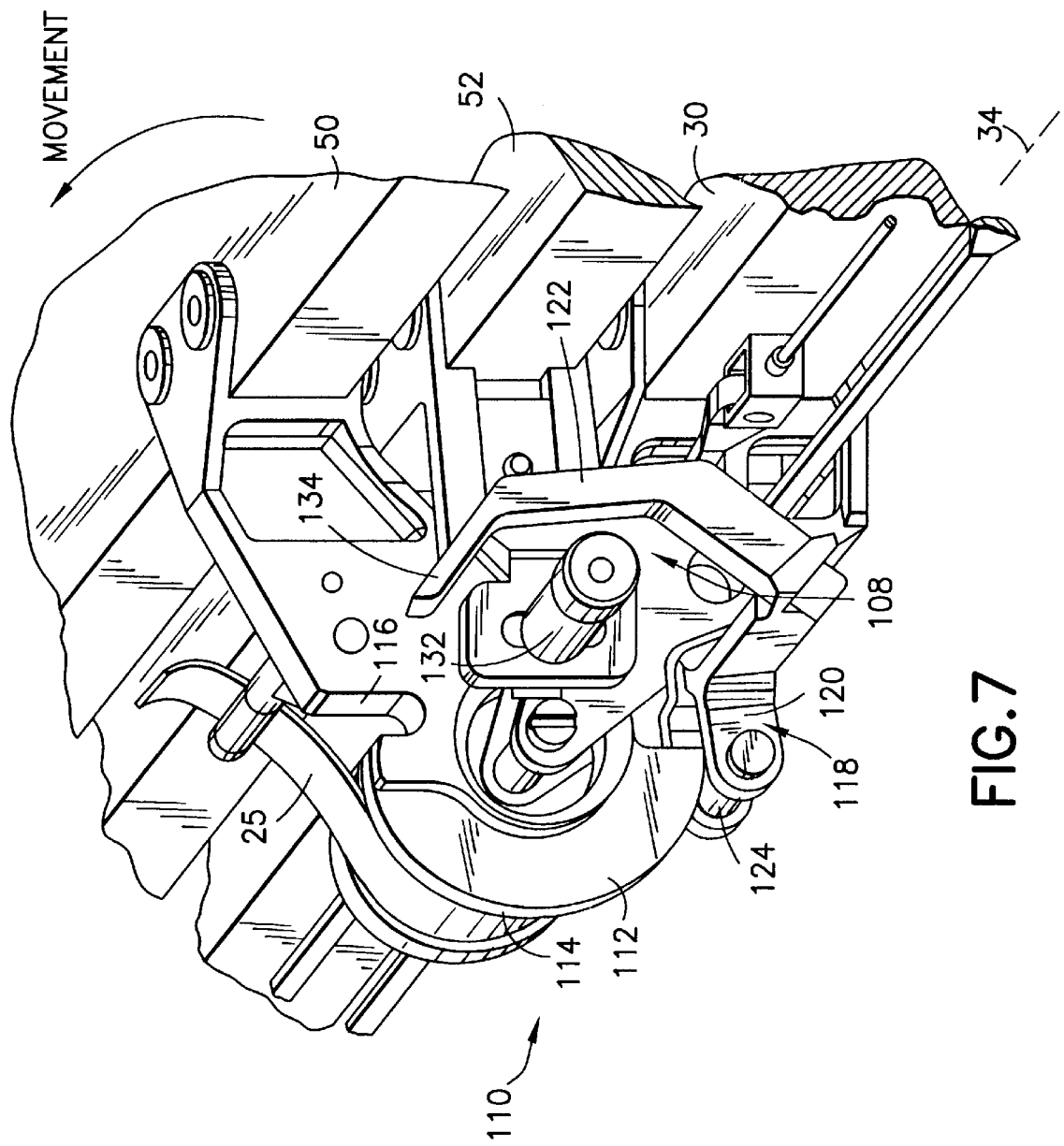
FIGS. 7, 7A and 7B are detail perspective views illustrating successive positions achieved by the restraint mechanism for preventing deployment of a side panel between stowed and deployed positions.
Figure 7A:
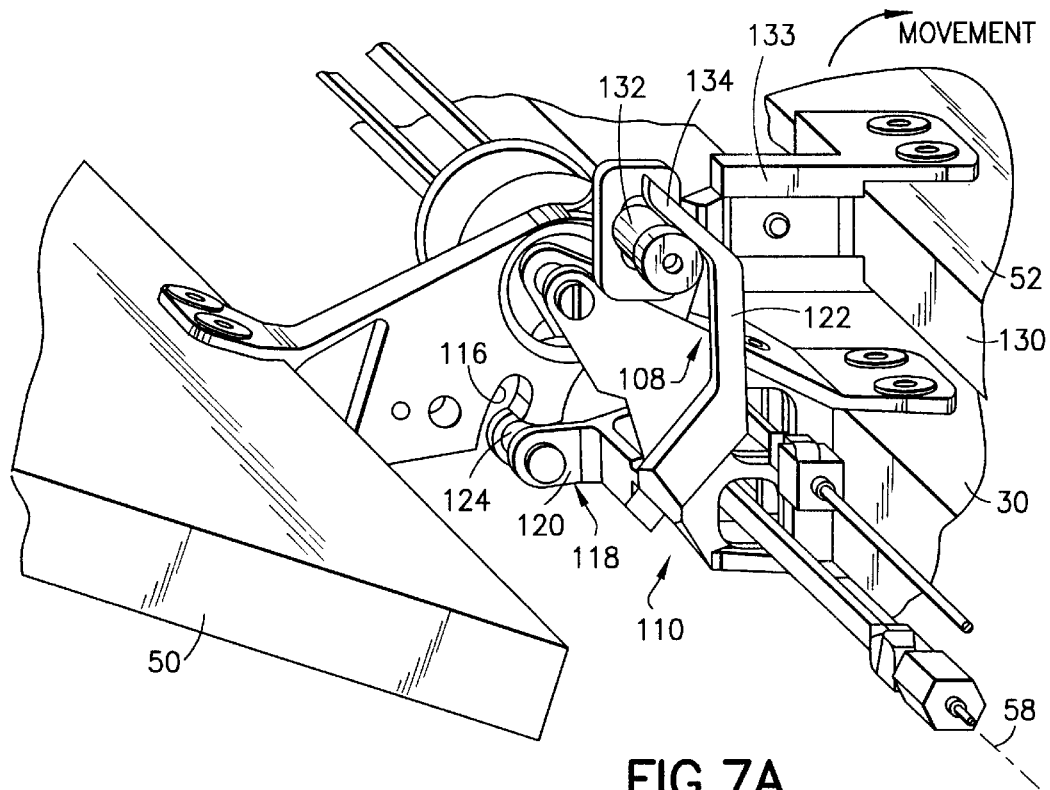
Figure 7B:
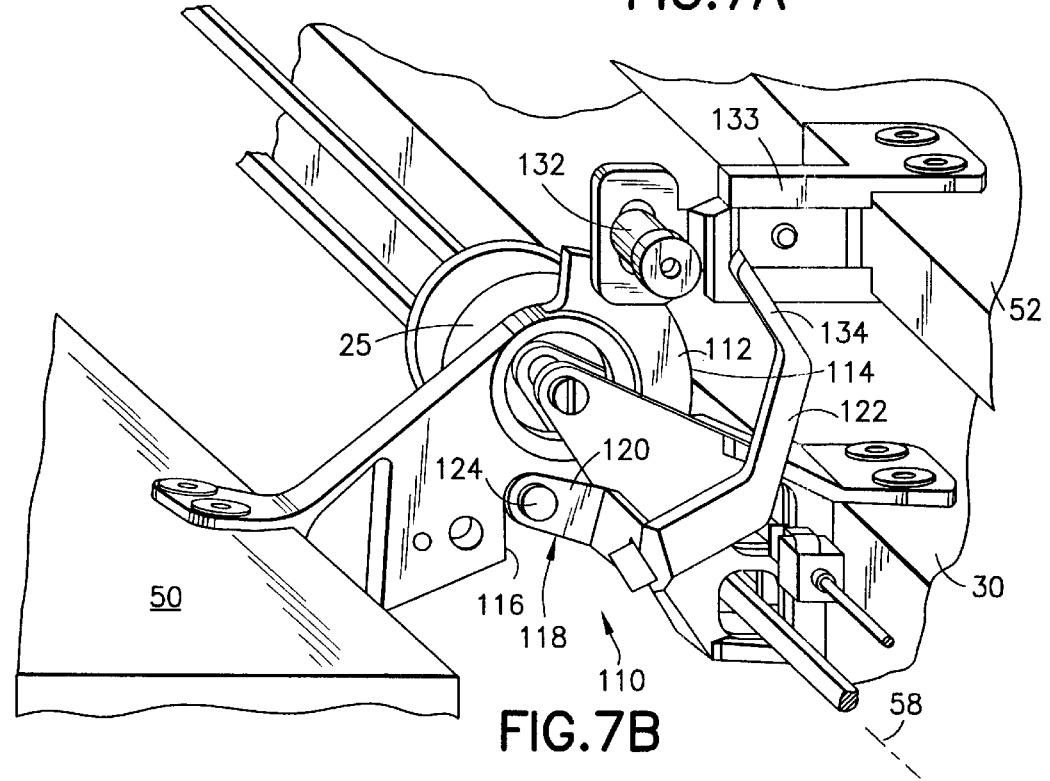

Turn now to FIGS. 7, 7A and 7B for a description of the construction and operation of the restraint mechanism for the side panel 52. The side panel 52 is pivotally connected to the in-line panel 30 for rotation between stowed and deployed positions about the tertiary hinge axis 60 which is transverse to the in-line hinge axis 34 and parallel to and spaced from the secondary hinge axis.

As earlier described, the drive mechanism 64 (FIGS. 1F and 1G) serves to move the side panel 52 between the stowed and the deployed positions. A restraint mechanism 108 (FIG. 7) is normally engaged with the side panel 52 to temporarily overpower the side panel drive mechanism 64 to thereby temporarily maintain that side panel in the stowed position but becomes disengaged from the side panel 52 when the side panel 50 reaches the deployed position and only then enables the side panel 52 to move to the deployed position. For this purpose, a deployment and locking mechanism 110 is provided for maintaining the side panel 50 in the deployed position.

The deployment and locking mechanism 110 includes a locking cam 112, similar to the cam 68, fixed on the side panel 50. The locking cam 112 includes a cam surface 114 which, like the cam surface 70 (FIG. 3), terminates at a locking recess 116. A cam follower 118 is pivotally mounted on the in-line panel 30 and includes a follower leg 120 integral with and extending transverse of a restraint lever 122 of the restraint mechanism 108. A follower roller 124 is rollingly mounted on the follower leg 120 distant from the pivot mount and is biased into engagement with the second cam surface by a resilient component (not shown) such as spring 78 (FIG. 3). The follower roller 124 is thereby enabled to travel along the cam surface 114 as the side panel 50 moves between the stowed and deployed positions under the influence of the drive mechanism 62.

Viewing FIGS. 1F and 1G, the side panel 52 is seen to have an inboard edge 128 adjacent to in-line panel 30 and aligned with the tertiary hinge axis 60. The side panel 52 also has an outboard edge 130 generally parallel to and spaced from the tertiary hinge axis and a restraint roller 132 mounted on a bracket 133 projecting away from the outboard edge 130. As earlier mentioned, the restraint mechanism 108 includes a restraint lever 122 which is integral with the cam follower 118. The restraint lever 122 extends from the pivotal mount on axis 58 to a restraining tab 134 at an extreme end distant from the pivotal mount, the restraining tab being normally engaged with the restraint roller 132 until the side panel 50 is fully deployed. When this occurs, the restraining tab 134 moves out of engagement with the restraint roller 132 thereby freeing the side panel 52 for movement to the deployed position.

It will be appreciated that when the side panel 52 reaches the fully deployed position illustrated in FIG. 1G, a deployment and locking mechanism identical in all aspects as the deployment and locking mechanism 66 for the side panel 50 is operable and effective to thereafter retain the side panel 52 in the fully deployed position.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Self-latching deployment apparatus for a multi-paneled solar array comprising:

first and second in-line panels pivotally connected together for rotation between stowed and deployed positions about an in-line hinge axis;

in-line panel drive means for moving said first and second in-line panels between the stowed and the deployed positions;

a first side panel pivotally connected to said second in-line panel for rotation between stowed and deployed positions about a secondary hinge axis transverse to said in-line hinge axis;

first locking means for maintaining said first and second in-line panels in the deployed position;

first side panel drive means for moving said first side panel between the stowed and the deployed positions; and first restraint means normally engaged with said first side panel to temporarily overpower said first side panel drive means to thereby temporarily maintain said first side panel in the stowed position but becoming disengaged from said first side panel when said first and second in-line panels reach the deployed position to enable said first side panel to move to the deployed position.

2. Self-latching deployment apparatus as set forth in claim 1 wherein said first and second in-line panels are substantially coextensive and lie in successively spaced planes when they are in their stowed positions and are substantially coplanar when they are in their deployed positions.

3. Self-latching deployment apparatus as set forth in claim 1 wherein said first locking means includes:

a first cam fixed to said first in-line panel and including a first cam surface terminating at a locking recess; and a first cam follower mounted on said second in-line panel and engaged with said first cam surface for travel therealong as said first and second in-line panels move between the stowed and deployed positions, said first cam follower being fully received in the locking recess when said first and second in-line panels are in the deployed position for locking said first and second in-line panels in the deployed position.

4. Self-latching deployment apparatus as set forth in claim 3 wherein said first restraint means includes:

a first restraint lever integral with said first cam follower extending to a restraining tab at an extreme end distant from said pivotal mount, said restraining tab being normally engaged with said first side panel until said first and second in-line panels are fully deployed at which time said restraining tab moves out of engagement with said first side panel thereby freeing said first side panel for movement to the deployed position.

5. Self-latching deployment apparatus as set forth in claim 4
wherein said first cam follower includes:
a follower leg integral with said first restraint lever;
a follower roller rollingly mounted on said follower leg distant from said pivot mount and engaged with said first cam surface; and
resilient means biasing said follower roller into engagement with said first cam surface.

6. Self-latching deployment apparatus as set forth in claim 4
wherein said first side panel has an inboard edge adjacent to and aligned with the secondary hinge axis; and
wherein said first side panel has an outboard edge generally parallel to and spaced from the secondary hinge axis and an engagement member projecting from said outboard edge for engagement with said restraining tab.

7. Self-latching deployment apparatus as set forth in claim 1 including:
a second side panel pivotally connected to said second in-line panel for rotation between stowed and deployed positions about a tertiary hinge axis transverse to said in-line hinge axis;
second side panel drive means for moving said second side panel between the stowed and the deployed positions; and
second restraint means normally engaged with said second side panel to temporarily overpower said second side panel drive means to thereby temporarily maintain said second side panel in the stowed position but becoming disengaged from said second side panel when said first side panel reaches the deployed position to enable said second side panel to move to the deployed position.

8. Self-latching deployment apparatus as set forth in claim 7
wherein the tertiary hinge axis is parallel to and spaced from the secondary hinge axis.

9. Self-latching deployment apparatus as set forth in claim 7 including:
second locking means for maintaining said first side panel in the deployed position.

10. Self-latching deployment apparatus as set forth in claim 9
wherein said second locking means includes:
a second cam fixed on said second in-line panel and including a second cam surface terminating at a second locking recess; and
a second cam follower pivotally mounted on said first side panel and engaged with said second cam surface for travel therealong as said first side panel moves between the stowed and deployed positions.

11. Self-latching deployment apparatus as set forth in claim 10
wherein said second cam follower includes:
a follower leg integral with said second restraint lever;
a follower roller rollingly mounted on said follower leg distant from said pivot mount and engaged with said second cam surface; and
resilient means biasing said follower roller into engagement with said second cam surface.

12. Self-latching deployment apparatus as set forth in claim 11
wherein said second side panel has an inboard edge adjacent to and aligned with the tertiary hinge axis; and
wherein said second side panel has an outboard edge generally parallel to and spaced from the tertiary hinge axis and a first hook member projecting away from said outboard edge; and
wherein said second restraint means includes:
a second restraint lever integral with said second cam follower extending to a second hook member at an extreme end distant from said pivotal mount, said second hook member being normally engaged with said first hook member until said first side panel is fully deployed at which time said second hook member moves out of engagement with said first hook member thereby freeing said second side panel for movement to the deployed position.

13. Self-latching deployment apparatus as set forth in claim 10
wherein said second side panel includes an integral first hook member; and
wherein said second restraint means includes:
a second restraint lever integral with said second cam follower extending to a second hook member at an extreme end distant from said pivotal mount of said second cam follower, said second hook member being normally engaged with said first hook member to maintain said second side panel in the stowed position until said first side panel is fully deployed at which time said second hook member moves out of engagement with said first hook member thereby freeing said second side panel for movement to the deployed position.

* * * * *